United States Patent [19]

Weaver

[11] 4,103,793
[45] Aug. 1, 1978

[54] FOLDING GOOSENECK TRAILER WITH POSITIONING SYSTEM

[75] Inventor: Leslie A. Weaver, Monon, Ind.

[73] Assignee: Talbert Manufacturing, Inc., Rensselaer, Ind.

[21] Appl. No.: 794,537

[22] Filed: May 6, 1977

[51] Int. Cl.² ............................................. B60P 1/20
[52] U.S. Cl. ................................ 214/506; 280/423 B
[58] Field of Search ............... 280/423 B, 425 A, 766; 214/506

[56] References Cited

U.S. PATENT DOCUMENTS

| | | | |
|---|---|---|---|
| 3,419,169 | 12/1968 | James | 214/506 |
| 3,894,645 | 7/1975 | Verschage | 214/506 |

Primary Examiner—John A. Pekar
Attorney, Agent, or Firm—John R. Nesbitt

[57] ABSTRACT

A folding gooseneck trailer is disclosed having a positioning system for positioning the main bed of the trailer relative to the ground as well as the loading bed, or hitch platform, relative to the main bed and the ground. The loading bed of the trailer is pivotally mounted on the front end of the trailer main bed by a pair of spaced connecting links so that the loading bed can be raised and lowered relative to the main bed. The main bed has wheels at the rear end and, in the raised position, the loading bed holds the front end of the main bed off of the ground when the loading bed is mounted on the fifth wheel of a tractor, as by a king pin. A power mechanism is connected between the loading bed and a clevis plate attached to an elongated sliding element the lower portion of which terminates in a ground engaging foot. The sliding element is received in a channel in the main bed so that the sliding element is constrained to vertical movement in opposite longitudinal directions. The power mechanism is a hydraulic cylinder and piston, and piston extention determines and controls the relative positioning of the sliding element and the main and loading beds, both with respect to one another and to the ground.

17 Claims, 5 Drawing Figures

FOLDING GOOSENECK TRAILER WITH POSITIONING SYSTEM

FIELD OF THE INVENTION

This invention relates to a folding gooseneck trailer and, more particularly, relates to a folding gooseneck trailer having a mechanism for positioning the main and loading beds.

BACKGROUND OF THE INVENTION

Gooseneck-type trailers are well known and are commonly used to haul other equipment such as road graders and the like. Gooseneck-type trailers may be found, by way of example, in U.S. Pat. Nos. 3,536,340; 3,215,449; 3,043,609; 2,907,581; 2,667,363; 2,613,945; 2,489,112; 3,041,087; and, 3,866,947. This type of gooseneck trailer also often used a ground engaging foot for holding the front end of the main bed off of the ground. Examples of such trailers may be found, for example, in U.S. Pat. Nos. 2,895,746 and 2,676,783.

To facilitate loading of the gooseneck-type trailer, the socalled folding gooseneck was later developed. Generally, such a trailer utilizes a loading bed (or hitch platform as it is also called) that can be moved from the raised position, which is normal for transporting purposes, to a position where the loading bed can be used as a ramp. Examples of folding gooseneck trailers may be found, again by way of example, in U.S. Pat. Nos. 3,833,019; 2,452,789; 2,568,283; 2,687,225; 2,656,195; 2,774,497; 2,725,994; 2,772,008; 2,611,496; 2,895,746; 2,676,783; 3,419,169; 3,756,443; and 3,894,645.

Pivots, including a pair of spaced links pivotally mounted at opposite ends of the main and loading beds, have heretofore been suggested for folding gooseneck trailers, and such mechanisms have heretofore utilized ground engaging foot supports for holding the front end of the main bed off of the ground. Examples of such devices may be found in U.S. Pat. Nos. 3,419,169, 3,756,443, and 3,894,645. Such devices have, however, required a plurality of power mechanisms to accomplish the function of relative movement between the beds and extension of the foot and/or have required additional support struts.

In view of the foregoing, it should be appreciated that improvements in folding gooseneck trailers and, in particular, improvements in the utilized positioning system could be useful.

SUMMARY OF THE INVENTION

This invention provides an improved positioning system for a folding gooseneck trailer and, more particularly, provides an improved folding gooseneck trailer wherein positioning of the loading bed and ground engageable foot, relative to the main bed, is facilitated.

It is therefore an object of this invention to provide an improved folding gooseneck trailer.

It is another object of this invention to provide an improved gooseneck trailer having a system for positioning the loading bed and ground engageable foot relative to the main bed.

It is still another object of this invention to provide an improved gooseneck trailer having an improved positioning system that utilizes a power mechanism and sliding element the lower portion of which is ground engageable.

It is yet another object of this invention to provide an improved gooseneck trailer having an improved positioning system that utilizes a power mechanism which controls pivoting of the loading bed relative to the main bed and controls ground engagement of the foot.

It is still another object of this invention to provide an improved positioning system for a folding gooseneck trailer.

It is yet another object of this invention to provide an improved positioning system for a folding gooseneck trailer that utilizes a hydraulic cylinder and piston connected with a sliding element the lower portion of which is ground engageable.

With these and other objects in view, which will become apparent to one skilled in the art as the description proceeds, this invention resides in the novel construction, combination, and arrangement of parts substantially as hereinafter described and more particularly defined by the appended claims, it being understood that such changes in the precise embodiment of the herein-disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
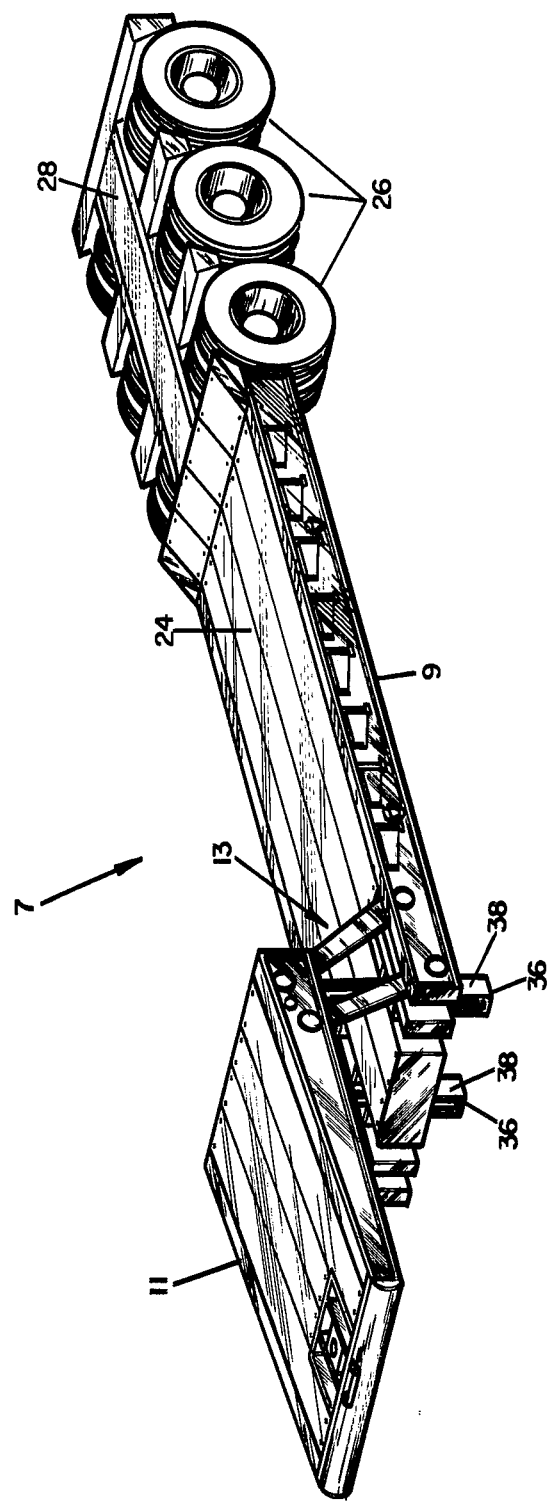
FIG. 1 is a prospective view of the folding gooseneck trailer.
Figure 2:
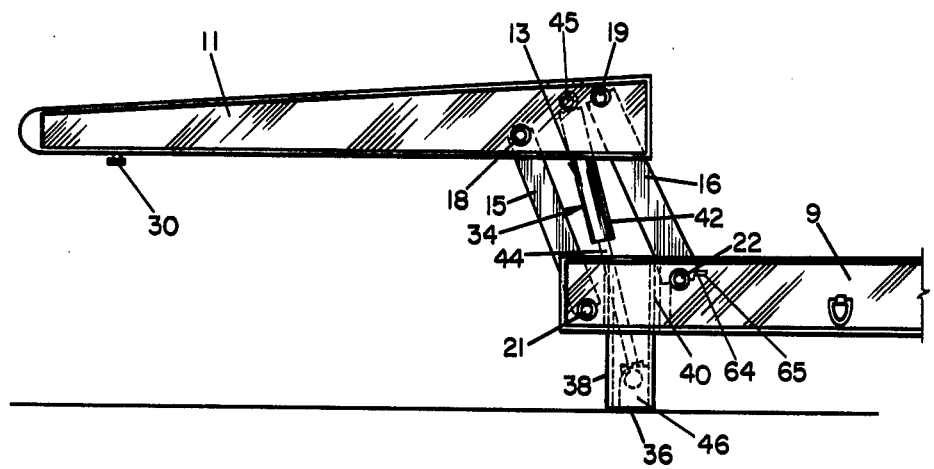
FIG. 2 is a side view of the folding gooseneck trailer shown in FIG. 1 with the loading bed raised and the foot in ground engagement.
Figure 3:
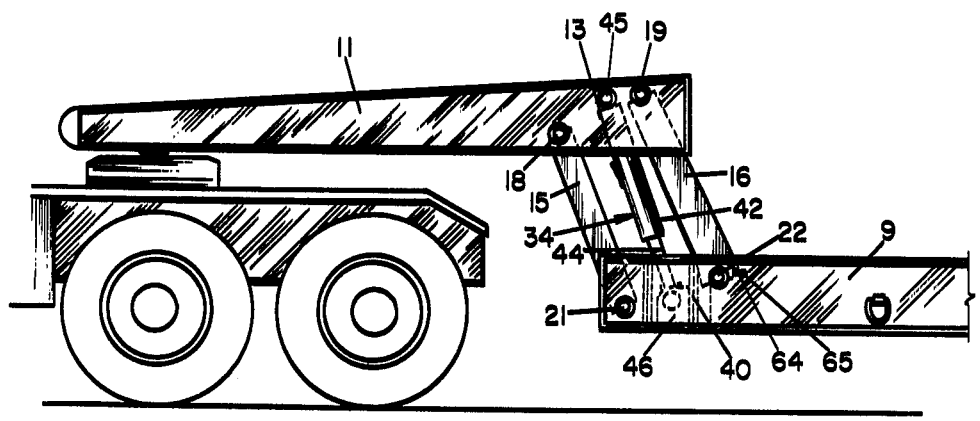
FIG. 3 is a side view of the folding gooseneck trailer shown in FIG. 1 with the loading bed raised and the foot raised so that the trailer is in position for transporting purposes.
Figure 4:
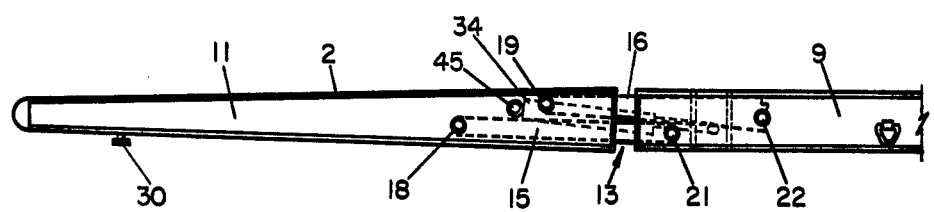
FIG. 4 is a side view of the folding gooseneck trailer shown in FIG. 1 with the loading bed lowered for use as a ramp.
Figure 5:
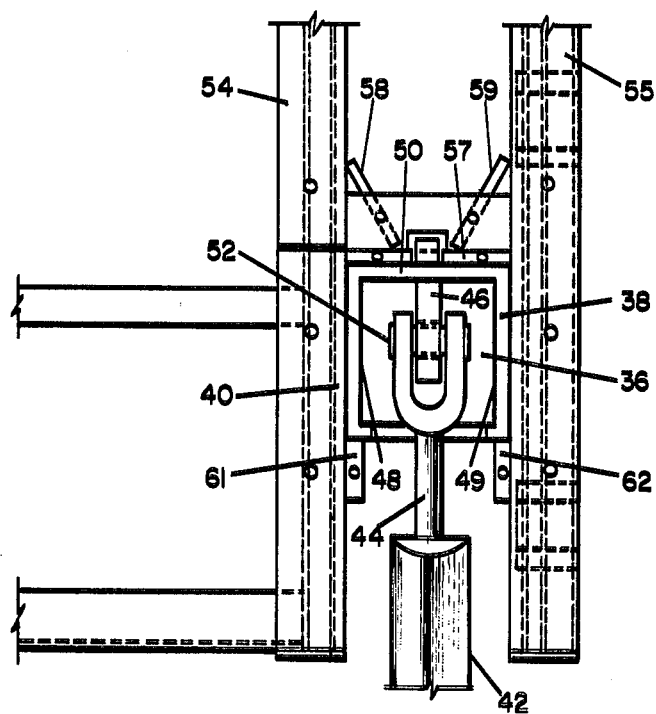
FIG. 5 is a top partial view showing the main bed channel with the sliding element therein.

Referring now to the drawings, folding gooseneck trailer 7 includes a main bed 9 and a loading bed, or hitch platform, 11. Loading bed 11 is pivotally mounted on main bed 9 by means of a connecting link 13 at each side of the main bed, and each connecting link preferably includes a pair of spaced links, or arms, 15 and 16 with one end of each arm being connected to the rear portion of the loading bed 11 at pivots 18 and 19 and the other end of each arm being connected to the front portion of the main bed 9 at pivots 21 and 22.

Main bed 9 has a deck 24 which extends rearwardly to a series of wheels 26 at the rear end of the trailer, with the deck being preferably raised with respect to that part of the frame 28 upon which the wheels are mounted. Loading bed 11 is preferably tapered toward the front to better act as a ramp as brought out hereinafter, and conventionally has a king pin 30 mounted on the under side of the front of the loading bed to adapt the loading bed for attachment to the fifth wheel of a tractor for transporting purposes.

Folding gooseneck trailers of the type referred to herein are well known in the art, as brought out hereinabove, and hence have been detailed herein only to the extent necessary to point out the improvements of this invention.

A power mechanism 34 is utilized to raise and lower the loading bed 11 relative to the main bed 9 and to raise and lower the foot 36 which can be the bottom of a sliding element 38 mounted in a channel 40 in main bed 9.

Power mechanism 34 includes a hydraulic cylinder 42 and piston 44 with the cylinder being pivotally mounted to the loading bed 11. As shown, cylinder 42 is connected to the loading bed at pivot 45, which is adjacent to pivot 19 for link 16, but could also be connected to the loading bed at pivot 19, if desired. Piston 44 is bifurcated at the outer end and is pivotally connected at opposite sides of a clevis plate 46 which is attached, as by welding, to sliding element 38.

Sliding element 38 is an elongated shaft or box-like structure in the form of a U-shaped channel with opposite sides 48 and 49 and back side 50, all of which are preferably of steel. As shown in the drawings, clevis plate 46 is attached to sliding element 38, as by welding the plate to the lower central portion of the back side 50 with the clevis plate being parallel to the sides 48 and 49 of the U-shaped channel. As also shown, the clevis plate is also preferably welded to foot 36 which is a horizontal plate attached to the bottom of the sliding element. As brought out hereinabove, the bifurcated ends of piston 44 are pivotally mounted at opposite sides of the clevis plate by pivot pin 52.

Sliding element 38 is received in a passage, or channel, 40 in the main bed rearwardly of pivot 21 for connecting link 15 and forwardly of pivot 22 for connecting link 16. Channel 40 may be formed as a part of the frame of the trailer, and accordingly may have the sides formed by parallel frame members 54 and 55 (or the sides could be separate plates, if desired). A back plate 57 is attached to the side plates and may be reinforced by struts 58 and 59 if desired. To complete the channel, a pair of shoulder plates 61 and 62 are attached to the side plates to leave the front of the channel open (as is necessary to allow the connection of the piston of the power mechanism to the clevis plate in the sliding element). The sliding element 38 may be of a substantially square cross-section and the channel 40 in the main bed is of slightly larger cross-section to constrain the sliding element to movement in opposite longitudinal directions so that the foot is entirely received in the channel (or extends thereabove) and may be extended from the channel so that the foot can engage the ground. The length of the sliding element is chosen, of course, so that the sliding element can be extended downwardly to allow the foot to engage the ground and yet maintain the upper end of the sliding element in the channel. The relative lengths of hydraulic cylinder 42 and piston 44 of power mechanism 34 and arms 15 and 16 of connecting link 13 are chosen, of course, so that the arms can be pivoted to effect the needed relative positioning of the main and loading beds as described herein, and so that the sliding element is maintained in the channel when moved upwardly by the power mechanism.

A stop is provided by cooperating stop members 64 and 65 to establish the maximum raised position that the loading bed can assume. As shown stop member 64 is a notched shoulder formed on the lower portion of connecting link 16 that is engageable with a stop abutment (cooperating stop member 65) on the main bed.

Hydraulic cylinder 42 is conventionally connected with a hydraulic source and return with a conventional control system also being utilized to control actuation of the hydraulic system.

In operation, when the piston is fully extended from the cylinder, the loading bed is held in a raised position with respect to the main bed and the sliding element is extended from the channel in the main bed so that the foot at the bottom of the sliding element is in ground engagement since the cylinder and piston assembly is connected between the loading bed and sliding element and the connecting link pivotally connects the main and loading beds.

For transporting purposes, the loading bed is commonly maintained raised relative to the main bed and the king pin is conventionally mounted on the fifth wheel of a tractor. When so connected to a tractor, by partially withdrawing the piston, the sliding element is withdrawn into the channel in the main bed and the trailer is ready for transporting purposes.

For loading or unloading of the trailer, the trailer is removed from connection to the tractor after the piston is fully extended so that the foot is in ground engagement. The piston is then withdrawn into the cylinder to cause the front end of the main bed to be first lowered to the ground by retracting the sliding element into the channel in the main bed, after which the loading bed is pivoted downwardly and thus lowered with respect to the main bed. The loading bed can then be used as a ramp for loading and unloading of the trailer.

When it is desired to raise the front end of the trailer, the piston is then extended from the cylinder to cause the loading bed to pivot upwardly, after which the sliding element is withdrawn from the channel in the main bed to thus raise the front end of the main bed. A tractor can then be connected to the raised loading bed and the trailer is ready for transporting purposes after the sliding element is withdrawn into the channel in the main bed.

As can be appreciated from the foregoing, the improved positioning system of this invention enables the loading bed and ground engaging foot to be positioned with a single power mechanism and without requiring struts or the like for effecting positioning and/or for foot support.

What is claimed is:

1. A folding gooseneck trailer, comprising:
   a main bed having ground engageable wheels at one portion and frame means defining at least a partial substantially vertical passage in said main bed at an end portion that is spaced from said one portion;
   a loading bed having an end portion adjacent to said end portion of said main bed;
   elongated pivotable connecting means for connecting said loading bed to said main bed at said adjacent end portions thereof whereby said loading bed can be raised and lowered with respect to said main bed;
   slidable means received in said passage in said main bed and constrained to substantially vertical movement with respect thereto, said slidable means having a bottom portion to serve as a ground engageable foot;
   clevis means connected to said slidable means; and
   extendible means connected between said loading bed and said clevis means whereby when said extendible means is extended said slidable means is extended from said passage in said main bed so that said foot is in ground engagement with said end portion of said main bed being then held in a raised position with respect to said ground by said extendible means and said pivotable connecting means, and whereby when said extendible means is retracted said slidable means is retracted within said passage in said main bed and said loading bed is pivoted with respect to said main bed at said pivotable connecting means so that said loading bed can assume a lowered position to act as a ramp for loading and unloading of said main bed.

2. The folding gooseneck trailer of claim 1 wherein said elongated pivotable connecting means includes a pair of parallel links each of which is pivotally connected at opposite ends to said main and loading beds of said trailer, and wherein said trailer has cooperating stop means on said main bed and one of said parallel links to provide a fully raised stop position.

3. The folding gooseneck trailer of claim 1 wherein said slidable means is an elongated shaft having dimensions slightly smaller than that of said passage in said main bed.

4. The folding gooseneck trailer of claim 3 wherein said shaft has a substantially square cross-section.

5. The folding gooseneck trailer of claim 4 wherein said shaft is in the form of a channel having said clevis means inside said channel.

6. The folding gooseneck trailer of claim 5 wherein said foot is formed by a horizontal foot plate connected to the bottom of said channel, wherein said clevis means is a flat clevis plate, and wherein said clevis plate is attached to said foot plate at the bottom portion of said channel.

7. The folding gooseneck trailer of claim 1 wherein said extendible means is a power actuated cylinder and piston assembly and wherein said piston is bifurcated at the outer end and pivotally connected with said clevis means at opposite sides thereof.

8. The folding gooseneck trailer of claim 1 wherein said loading bed has tractor mounting means at the end portion opposite to that of said end portion having said pivotable connecting means pivoted thereon, and wherein said extendible means may be at least partially retracted when said loading bed is mounted on a tractor by said tractor mounting means, said at least partial retraction of said extendible means causing said slidable means to be withdrawn into said passage in said main bed.

9. A folding gooseneck trailer, comprising:
a main bed having ground engaging wheels at one end portion and frame means defining at least a partial substantially vertical rectangular passage in said main bed at the other end portion;
a loading bed having a king pin mounted on one end portion for adapting said loading bed to be connected with the fifth wheel of a tractor, the other end portion of said loading bed being adjacent to said main bed;
a pair of parallel links each of which is pivotally connected at opposite ends to the other end portions of said main and loading beds so that said loading bed can be raised and lowered with respect to said main bed;
an elongated element having a cross-section smaller than that of said rectangular passage in said main bed so that said element is movable in and constrained to movement in opposite longitudinal directions with respect to said element, said elongated element terminating at the bottom portion in a ground engageable foot;
a clevis plate connected to the bottom portion of said elongated element; and
a power actuated cylinder and piston assembly connected between said loading bed and clevis whereby when said piston is extended said elongated element is extended from said passage in said main bed so that said foot is in ground engagement with said other end portion of said main bed being then held in a raised position with respect to said ground by said cylinder and piston assembly and said parallel links, and whereby said piston is retracted said elongated element is withdrawn into said passage in said main bed and said loading bed is pivoted with respect to said main bed at said pair of parallel links so that said loading bed can assume a lowered position to act as a ramp for loading and unloading from said main bed.

10. The folding gooseneck trailer of claim 9 wherein said elongated element is formed by a channel opened toward the loading bed, wherein said foot is a horizontal foot plate, and wherein said clevis plate is centrally positioned within said channel, said clevis plate also being centrally connected to said foot plate.

11. The folding gooseneck trailer of claim 9 wherein said main bed and one of said parallel lengths has cooperating stop means thereon to provide a stop at the fully raised position of said loading bed.

12. In a folding gooseneck trailer having a loading bed pivotally connected to a main bed by a connecting link, a positioning system, comprising:
frame means in the main bed of the trailer defining a substantially vertical channel;
slidable means received in said channel of said frame means, said slidable means terminating at one end portion in a foot and having connecting means thereon; and
an extendible power actuator connected between the loading bed of the trailer and said connecting means of said slidable means for controlling the relative movements of said main bed, loading bed and slidable means whereby said foot on said slidable means may be extended and retracted with respect to said frame means of said main bed by said power actuator and said loading bed may be pivoted with respect to said main bed by said power actuator and said connecting link.

13. The positioning system of claim 12 wherein said slidable means is an elongated substantially U-shaped element open toward said connecting link, and wherein said connecting means is a clevis connected to the interior of said element at said foot thereon.

14. The positioning system of claim 13 wherein said power actuator is a hydraulic cylinder and piston assembly, said piston being pivotally connected to said clevis.

15. The positioning system of claim 14 wherein said piston is withdrawn into said cylinder to cause said U-shaped element to be withdrawn into said channel in said main bed and is extended to cause said U-shaped element to be extended out of said channel so that said foot is in ground engagement.

16. The positioning system of claim 15 wherein extension of said piston causes said loading bed to be raised with respect to said main bed, and wherein said connecting link and main bed have cooperating stop means thereon to establish the maximum raised position of said loading bed.

17. The positioning system of claim 16 wherein said connecting link includes an arm pivotally connected to said main bed, and wherein said cooperating means is formed by a shoulder on said arm adjacent to said pivotal connection to said main bed and an abutment on said main bed engageable with said shoulder.

* * * * *